United States Patent
Barbarich

(10) Patent No.: US 6,852,446 B2
(45) Date of Patent: Feb. 8, 2005

(54) NON-AQUEOUS ELECTROLYTES FOR LITHIUM ELECTROCHEMICAL CELLS

(75) Inventor: Thomas J. Barbarich, Westerly, RI (US)

(73) Assignee: Yardney Technical Products, Inc., Pawcatuck, CT (US)

( * ) Notice: Subject to any disclaimer, the term of this patent is extended or adjusted under 35 U.S.C. 154(b) by 0 days.

(21) Appl. No.: 10/289,784

(22) Filed: Nov. 7, 2002

(65) Prior Publication Data

US 2003/0108800 A1 Jun. 12, 2003

Related U.S. Application Data

(60) Provisional application No. 60/347,083, filed on Nov. 9, 2001.

(51) Int. Cl.$^7$ ............................................... H01M 6/04
(52) U.S. Cl. ..................... 429/207; 429/188; 429/203; 429/338; 429/339; 429/341; 429/342; 429/337; 429/231.8; 429/231.95; 429/231.1; 429/324
(58) Field of Search ............................... 429/324, 322, 429/323, 231.95, 231.8, 231.1, 339, 341, 342, 188, 203, 207, 337, 338

(56) References Cited

U.S. PATENT DOCUMENTS 6,022,643 A * 2/2000 Lee et al. .................... 429/324
6,395,671 B2 * 5/2002 LaPointe .................... 502/150

FOREIGN PATENT DOCUMENTS

JP 2002-260734 * 9/2002

OTHER PUBLICATIONS

Lee et al. "The Synthesis of a New Family of Boro–Based Anion Receptors and the Study of Their Effect in Ion Pair Dissociation and Conductivity of Lithium Salts in Nonaqueous Solutions" J.Electrochem. Soc., vol. 145, No. 8, Aug. 1998, pp. 2813–2818.*

Sun et al. "Comparative Studies of the Electrochemical and Thermal Stability of Two Types of Composite Lithium Battery Electrolytes Using Boron–Based Anion Receptors" Journal of the Electrochemical Society, 146 (10), 1999, pp. 3655–3659.*

LaPointe et al. "New Family of Weakly Coordinating Anions" J. Am. Chem. Soc. 2000, 122, pp. 9560–0561.*

* cited by examiner

Primary Examiner—Laura Weiner
(74) Attorney, Agent, or Firm—John R. Doherty

(57) ABSTRACT

A non-aqueous electric current producing electrochemical cell is provided comprising an anode and a cathode, an ionically permeable separator interposed between the anode and the cathode, and a non-aqueous electrolyte, the electrolyte comprising an ionically conducting salt in a non-aqueous medium, the ionically conducting salt corresponding to the formula:

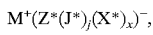

wherein:
  M is a lithium atom,
  Z* is an anion group containing two or more Lewis basic sites and comprising less than 50 atoms not including hydrogen atoms,
  J* independently each occurance is a Lewis acid coordinated to at least one Lewis basic site of Z*, and optionally two or more such J* groups may be joined together in a moiety having multiple Lewis acidic functionality,
  X* independently each occurrence is selected from the group consisting of H, $C_1$–$C_4$ alkyl, alkoxide, halide and mixtures thereof,
  j is an integer from 2 to 12, and
  x is an integer from 0 to 4.

40 Claims, 3 Drawing Sheets

NON-AQUEOUS ELECTROLYTES FOR LITHIUM ELECTROCHEMICAL CELLS

This application claims benefit of provisional application Ser. No. 60/347,083 filed Nov. 9, 2001.

GOVERNMENT RIGHTS IN THE INVENTION

This invention was made with support under Air Force Contract No. F33615-98-C-2898. The Government has certain rights in the invention.

FIELD OF THE INVENTION

This invention relates to non-aqueous electric current producing electrochemical cells in general and more particularly to both primary and secondary lithium cells employing non-aqueous electrolytes containing a new class of lithium salts which are highly ionically conductive and which exhibit good thermal stability.

BACKGROUND OF THE INVENTION

One attractive class of modern high energy density rechargeable cells is the Lithium-ion (Li-ion) cell. The principle components of a Li-ion cell are graphitic carbon anode, for example, natural or artificial graphite, a typical example being mesocarbon microbead (MCMB) carbon, a lithiated transition metal oxide cathode such as $LiCoO_2$, and a highly conductive electrolyte solution. The electrolyte provides mobility to the Li ions, which are transported from the anode to the cathode, and vice versa, during discharge and charge of the battery. The electrolyte in a Li-ion cell is composed of a lithium salt that is dissolved in a nonaqueous solvent such as an organic carbonate(s). To a large extent, the salt used in the electrolyte of the cell governs the overall performance of the cell and the salt must therefore meet certain requirements. In terms of performance, a salt must have high conductivity, high thermal stability, and electrochemical stability above the potential of the fully charged cell (4.1 V vs. Li in cells employing carbon anode materials), and be nontoxic and safe.

Unfortunately, no salts adequately meet all the cost, performance, and safety requirements imposed by the industry. The most common salt in use today is $LiPF_6$, which is added to organic carbonate solvent mixtures to form the electrolyte solution. This salt has excellent conductivity and electrochemical stability in these solvents but is expensive. In addition, this salt is limited to an operational temperature range of −40° C. to +50° C. The $LiPF_6$ is thermally unstable and is believed to decompose at temperatures above 60° C. according Equation 1 below.

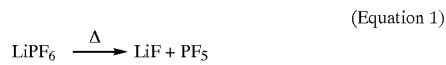
(Equation 1)

In addition, both $LiPF_6$ and $PF_5$ are susceptible to hydrolysis and, as a result, they will react with any moisture in the electrolyte according to Equations 2 and 3 to form HF.

$LiPF_6 + H_2O \rightarrow POF_3 + 2HF + LiF$ (Equation 2)

$PF_5 + H_2O \rightarrow POF_3 + 2HF$ (Equation 3)

The HF and $PF_5$ can catalyze the decomposition of the solvents, react with the electrodes to increase the electrode/electrolyte interfacial impedance, and corrode the current collectors. Other lithium salts based on perfluorinated inorganic anions with the general formula $LiMF_x$, have been extensively studied. The order of conductivity of these salts is $LiSbF_6 > LiAsF_6 \approx LiPF_6 > LiBF_4$. However, each of these salts has either poor electrochemical stability ($LiSbF_6$), toxicity ($LiAsF_6$), or poor cycling efficiency ($LiBF_4$).

The recent development of several organic anions, some of which have high conductivities, has overcome some of the performance problems with the inorganic anions. The most promising group of these anions is that based on fluorinated sulfonyl ligands. The Li salt of $N(SO_2CF_3)_2^-$, for example, is highly conductive and thermally stable to 360° C. However, it has been reported to corrode aluminum at high potentials which is a problem for cells employing aluminum current collectors. Other related salts being investigated include $LiC(SO_2CF_3)_3$ and those obtained by the substitution of various fluorinated organic groups (R) on $LiN(SO_2R)_2$. While these anions have promising performance characteristics, they are expensive and the need for an inexpensive salt remains unsatisfied.

U.S. Pat. No. 6,022,643 issued to Hung S. Lee et al. on Feb. 8, 2000, assigned to Brookhaven National Laboratory, discloses that the addition of a three-coordinate boron compound to a lithium salt in organic carbonate solutions dramatically increases the conductivity of the lithium salt. The lithium salts, LiF, $CF_3CO_2Li$, and $C_2F_5CO_2Li$, were combined with various organofluorine boron based compounds. The patentees referred to the three coordinate boron based compounds as "anion receptors" because they would seek a fourth ligand from the salt anion, thus increasing the conductance and Li transference number. While these solutions are conductive and electrochemically stable over the necessary potential range, they require the use of an expensive Lewis acid in a 1:1 ratio with the lithium salt, which increases the cost of the electrolyte.

U.S. Pat. No. 6,395,671 issued to Robert E. LaPointe, assigned to The Dow Chemical Company, discloses that the addition of two Lewis acids to a monoanionic species with two Lewis basic sites yields an anion that is only very weakly Lewis basic. Potassium and ammonium salts of these anions were prepared, and the ammonium salts were used in the preparation of olefin polymerization catalysts, which requires that the anion be dissociated from cation. The dissociation of the anion from the cation (ie. low degree of ion-pairing) is also important in achieving a highly conductive lithium salt. However, the synthetic routes to the salts shown below in Equations 4 and 5 do not include a synthetic route to a lithium salt.

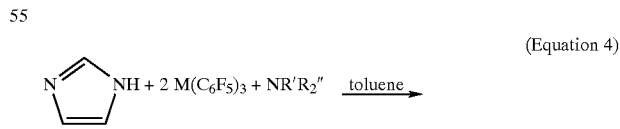
(Equation 4)

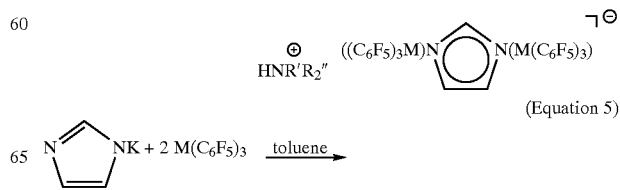
(Equation 5)

-continued

SUMMARY OF THE INVENTION

According to the present invention, a non-aqueous electric current producing electrochemical cell is provided comprising an anode and a cathode, an ionically permeable separator interposed between the anode and the cathode, and a non-aqueous electrolyte comprising an ionically conducting salt in a non-aqueous medium, the ionically conducting salt corresponding to the formula:

$$M^+(Z^*(J^*)_j(X^*)_x)^-,$$

wherein:
M is a lithium atom,
Z* is an anion group containing two or more Lewis basic sites and comprising less than 50 atoms not including hydrogen atoms,
J* independently each occurance is a Lewis acid coordinated to at least one Lewis basic site of Z*, and optionally two or more such J* groups may be joined together in a moiety having multiple Lewis acidic functionality,
X* independently each occurrence is selected from the group consisting of H, $C_1$–$C_4$ alkyl, alkoxide, halide and mixtures thereof,
j is an integer from 2 to 12, and
x is an integer from 0 to 4.

The present invention is based on the unexpected discovery that anions similar to those investigated by LaPointe, supra, for use specifically as catalyst activators, but coupled in this case with a lithium based cation make excellent candidates for use as the ionically conducting salt in a lithium cell electrolyte. The lithium salt used in the non-aqueous electrolyte according to the present invention is prepared from the combination of an anion having a 1– charge that has multiple Lewis basic sites and a sufficient quantity of a Lewis acid such that all the Lewis basic sites of the anion are complexed. The salt may be incorporated within a non-aqueous liquid medium such as, for example, an organic solvent. The salt may also be employed with various polymers and gels as the non-aqueous medium. The non-aqueous cell electrolyte of the present invention is useful in both primary and secondary lithium cells. The cell electrolyte is compatible with other cell components and generally exhibits good conductivity and thermal stability. The electrolyte is furthermore relatively easy to prepare and inexpensive to use in typical lithium cells.

DETAILED DESCRIPTION OF THE INVENTION

Figure 1:
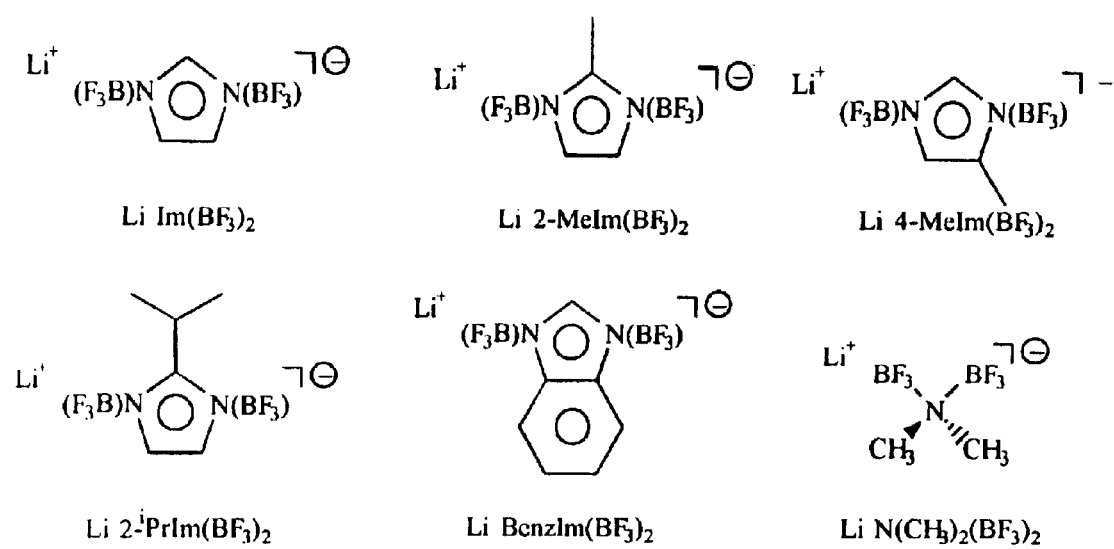
FIG. 1 illustrates the chemical structure of a number of lithium salts used in the preparation of electrolytes and cells according to the present invention. The abbreviations listed below each structure correspond to the abbreviations used in the detailed description and examples herein.

It has been discovered in accordance with the present invention that non-aqueous, primary and secondary, electric current producing electrochemical cells having good performance characteristics can be prepared at relatively low costs by employing a novel class of conductive lithium salts in various non-aqueous mediums as the cell electrolyte. The novel class of conductive lithium salts correspond to the general formula:

$$M^+(Z^*(J^*)_j(X^*)_x)^-,$$

wherein:
M is a lithium atom,
Z* is an anion group containing two or more Lewis basic sites and comprising less than 50 atoms not including hydrogen atoms,
J* independently each occurance is a Lewis acid coordinated to at least one Lewis basic site of Z*, and optionally two or more such J* groups may be joined together in a moiety having multiple Lewis acidic functionality,
X* independently each occurrence is selected from the group consisting of H, $C_1$–$C_4$ alkyl, alkoxide, halide and mixtures thereof,
j is an integer from 2 to 12, and
x is an integer from 0 to 4.

Z* can be any anionic moiety having a 1– overall charge and containing two or more Lewis basic sites. Preferably, the Lewis base sites are on different atoms of a polyatomic anionic moiety. Desirably, such Lewis basic sites are relatively sterically accessible to the Lewis acid, J*. Preferably the Lewis basic sites are on nitrogen atoms or carbon atoms. Examples of suitable Z* anions include cyanide, azide, amide, amidinide, substituted amidinide, dicyanamide, imidazolide, substituted imidazolide, imidazolinide, substituted imidazolinide, benzoimidazolide, substituted benzoimidazolide, tricyanomethide, tetracyanoborate, puride, squarate, 1,2,3-triazolide, substituted 1,2,3-triazolide, 1,2,4-triazolide, substituted 1,2,4-triazolide, pyrimidinide, substituted pyrimidinide, tetraimidazoylborate, substituted tetraimidazoylborate, tris (imidazoyl)fluoroborate, substituted tris(imidazoyl) fluoroborate, bis(imidazoyl)difluoroborate, substituted bis (imidazoyl)difluoroborate anions and mixtures thereof, wherein each substituent, if present, is is selected from the group consisting of a halo, hydrocarbyl, halohydrocarbyl, silyl, silylhydrocarbyl, a halocarbyl group of up to 20 atoms not counting hydrogen and mixtures thereof, and further wherein two substituents, if present, together form a saturated or unsaturated ring system. Preferred Z* groups are imidazolide, 2-methylimidazolide, 4-methylimidazolide, benzoimidazolide, and dimethylamide.

Coordinated to the Lewis base sites of the anion are from 2 to 12 Lewis acids, J*, two or more of which may be joined together in a moiety having multiple Lewis acid functionality. Preferably, from 2 to 4 J* groups having from 3 to 100 atoms are present. Preferred Lewis acids are those having a formula selected from the group consisting of

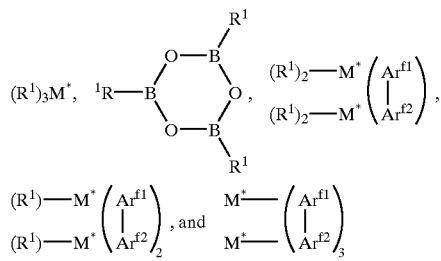

as well as mixtures thereof
wherein:
M* is aluminum or boron;
$R^1$ independently each occurrence is a compound selected from the group consisting of a halide, alkyl, aryl, alkoxide, aryloxide, dialkylamido, halogenated alkyl, halogenated aryl, halogenated alkoxide, halogenated aryl oxide and mixtures thereof, said $R^1$ having up to twenty carbon atoms, and
$Ar^{f1}$—$Ar^{f2}$ in combination is independently, a divalent aromatic group of 6 to 20 carbon atoms.

Highly preferred Lewis acids are $BR^1_3$ and $AlR^1_3$ wherein $R^1$ independently each occurrence is selected from the group consisting of a halogen, alkoxide, fluorinated alkoxide, halogenated alkyl, halogenated aryl and mixtures thereof, $R^1$ having up to 20 carbon atoms. In a more highly preferred embodiment, $R^1$ is a fluorine atom.

The foregoing lithium salts (illustrated by those having imidazolide, substituted imidazolide, benzoimidazolide, substituted benzoimidazolide, and amide) may be depicted below as follows:

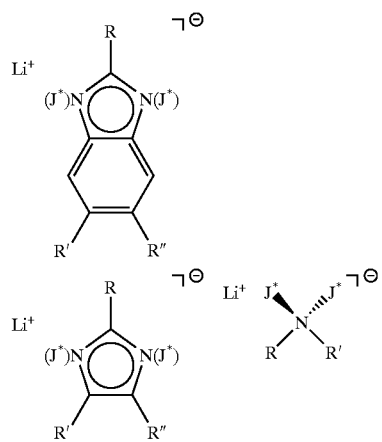

wherein:
Li is lithium,
R, R', and R" are hydrogen or hydrocarbyl group,
and J* is a Lewis acid, for example, $BF_3$, $B(OCH_3)_3$, $B(C_6F_5)_3$, or $B(OCH(CF_3)_2)_3$.

Examples of the highly preferred lithium salts include lithium salts of bis(trifluorborane)imidazolide, bis(trifluorborane)-2-methylimidazolide, bis(trifluorborane)-4-methylimidazolide, bis(trifluorborane)-2-isopropylimidazolide, bis(trifluorborane)benzimidazolide, bis(trifluorborane)dimethylamide, bis(trifluoroborane)diisopropylamide, bis(trimethoxyborane)imidazolide, bis(trimethoxyborane)-2-methylimidazolide, bis(trimethoxyborane)-4-methylimidazolide, bis(trimethoxyborane)-2-isopropylimidazolide, bis(trimethoxyborane)benzimidazolide, bis(trimethoxyborane)dimethylamide, bis(trimethoxyborane)diisopropylamide.

The compounds may be prepared by a condensation reaction between the lithium salt of the anion Z* and a Lewis acid, J*, or its Lewis acid base adduct such as an etherate. For example, contacting imidazole, or substituted imidazole, with a lithium alkyl such as n-BuLi will yield lithium imidazolide, or substituted lithium imidazolide. The lithium imidazolide may then be contacted with a Lewis acid, J*, or its Lewis base adduct to yield the desired lithium salt. Preferably, the reaction is performed in non-aqueous and non-protic solvents. Electrolytes may be prepared by dissolving the lithium salt into an organic solvent, a polymer, or a gel.

Figure 2:
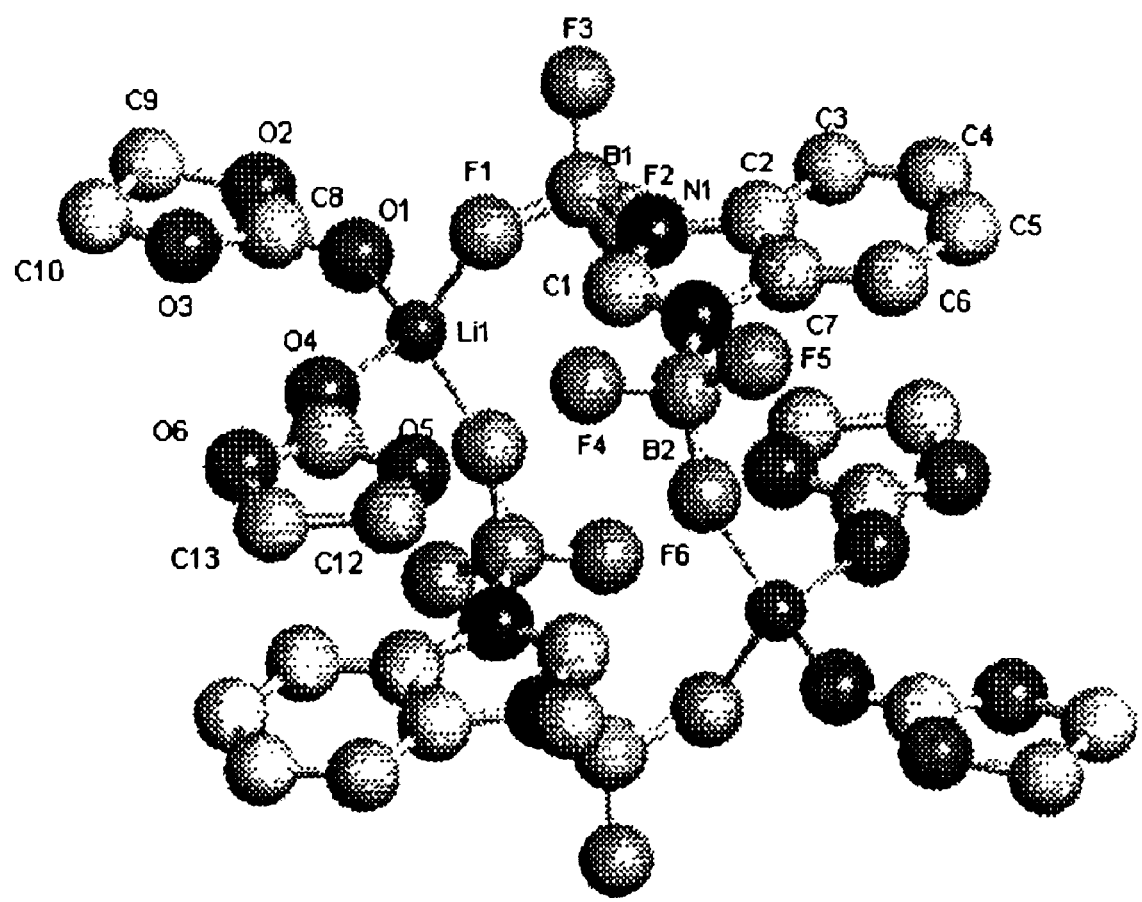
FIG. 2 is an x-ray structure of LiBenzIm $(BF_3)_2$. Two LiBenzIm $(BF_3)_2$.2 ethylene carbonate molecules are present in the structure shown with each related by symmetry. Atoms are labeled as F=fluorine, C=carbon, B=boron, Li=lithium, N=nitrogen, O=oxygen with a numeric suffix to distinguish atoms that are not related by symmetry. Hydrogen atoms are omitted for clarity.

As shown in FIG. 2, Li [BenzIm(BF$_3$)$_2$] (BenzIm=benzimidazolide), ie. a lithium salt of the [BenzIm(BF$_3$)$_2$]$^-$ anion, the benzimidazolide anion appears to be complexed at both of the Lewis basic nitrogen atoms by Lewis acidic BF$_3$. Without being bound by any theory, it is believed that each Li cation is bonded to a fluorine atom from one BF$_3$ group of two [BenzIm (BF$_3$)$_2$]$^-$ anions. The lithium cation appears to be further bonded to the carbonyl oxygen atom of two ethylene carbonate molecules which cocrystallized with the compound. In order to maintain electroneutrality, there is one lithium cation per anion.

It has been discovered that these compounds, when added to an appropriate solvent, form a useful electrolyte for lithium and Li-ion batteries. Suitable solvents include non-aqueous liquid polar solvents such as organic carbonates including ethylene carbonate, dimethyl carbonate ethylmethyl carbonate, diethyl carbonate and mixtures thereof Other solvents which may be in a mixture with organic carbonates are organic ethers, lactones, such as gama-butyrolactone, formates, esters, sulfones, nitriles, and oxazolidinones which are used in primary and secondary Li batteries.

Electrolytes prepared from these salts have been found to be highly conductive and electrochemically stable over the operating range of a lithium and Li-ion cell. Furthermore, cells prepared with these electrolytes have low capacity fade over several cycles demonstrating long cycle life.

Without being bound by any theory, it is believed that these compounds have high conductivity because there is a high degree of separation of the ions in the electrolyte. Separation of the anions from the cations is necessary for the formation of charged species in solution, thus allowing the transfer of the cations from the anode to the cathode during discharge and from the cathode to the anode during charge. Increasing the fraction of the cations that are separated from the anions relative to those that are ion-paired to the anion should increase the overall conductivity of the electrolyte thereby increasing the rate capability and cathode utilization of an electrochemical cell. These compounds have a high degree of separation between the cation and the anion because the anions are very weakly basic, which will allow the solvent, a stronger Lewis base, to bond to and effectively solvate the lithium cation, thus separating the anion from the cation. The Lewis basicity of the anion is minimized by proper choice of a Lewis base, $Z^*$, and Lewis acid, $J^*$. In general, it is preferable to have Lewis base sites that are on different atoms of a polyatomic anionic moiety so that the charge is delocalized over a large portion of the anion so that there is less electrostatic interactions between the anion and cation. It is also preferable that the Lewis acid $J^*$ be strongly Lewis acidic and incorporate highly electronegative atoms because this will allow it to form a strong complex to the Lewis base and have high electrochemical stability. Furthermore, it is sometimes advantageous to keep the salt to a low mass, as high mass salts can lead to viscous solutions, thus reducing the conductivity. Therefore, low mass Lewis acids such as $BF_3$ are preferred although higher mass Lewis acids such as $B(C_6F_5)_3$ and $B(OCH(CF_3)_2)_3$ are not excluded from this invention.

The new materials may be used in primary cells, which have an anode and cathode as components of the cell. Typical anode materials which may be used in primary cells are lithium, lithium alloys, lithium carbon intercalated compounds, lithium graphite intercalation compounds, lithium metal oxide intercalation compounds, and mixtures thereof The cathode in a primary cell is typically composed of a transition metal oxide, a transition metal chalcogenide, a poly(carbondisulfide) polymer, an organo-disulfide redox polymer, a polyaniline, an organodisulfide/polyaniline composite and an oxychloride. Examples of materials that may be used as a cathode in a primary cell include $SO_2$, CuO, CuS, $Ag_2CrO_4$, $I_2$, $PbI_2$, PbS, $SOCl_2$, $V_2O_5$, $MoO_3$, or $MnO2$, or poly(carbon manofluoride), $(CF)n$. Typically, organic solvents such as acetonitrile and propylene carbonate and inorganic solvents, such as thionyl chloride are used in primary cells.

The compounds have been found to be useful in secondary (rechargeable) cells. A secondary lithium or lithium-ion battery must have a cathode and anode, one of which has lithium incorporated into it. The anode for these cells is capable of reversibly incorporating lithium metal. Examples of these materials include lithium metal, lithium alloys, lithium-carbon or lithium-graphite intercalation compounds, lithium metal oxide intercalation compounds such as $Li_xWO_2$ or $LiMoO_2$ or a lithium metal sulfide such as $LiTiS_2$. The cathode material must also be capable of reversibly incorporating lithium metal. Suitable cathode materials include transition metal oxides and transition metal chalogenides, examples of which are $LiNi_{0.8}Co_{0.2}O_2$, $Li_{2.5}V_6O_{13}$, $Li_{1.2}V_2O_5$, $LiCoO_2$, $LiNiO_2$, $LiMn_2O_4$, $LiMnO_2$, $Li_3NbSe_3$, $LiTiS_2$, and $LiMoS_2$.

In assembling the cell of the present invention, the cathode is typically fabricated by depositing a slurry of the cathode material, a electrically conductive inert material, the binder, and a liquid carrier on the cathode current collector, and then evaporating the carrier to leave a coherent mass in electrical contact with the current collector.

In assembling a cell of the present invention, the anode can similarly be fabricated by depositing slurry of the highly graphitic carbonaceous anode material, the electrically conductive inert material, the binder, and a liquid carrier on the anode current collector, and then evaporating the carrier to leave a coherent mass in electrical contact with the current collector.

The cathode assembly is then combined with the anode assembly with the porous non-conducting separator sandwiched between these two assemblies. Suitable porous non-conducting separator materials include microporous polyethylene film and a porous glass membrane, for example. The preferred way of constructing high voltage rechargeable cells is to make them with the cathode in the discharged state because the material is stable in air. In a Li-ion cell employing a carbonaceous anode material, this material is also in a discharged state during cell assembly. The layered assembly is then wound around a metal post which may serve as terminal for the cell. Alternatively, several of these layers maybe assembled together to form a prismatic cell. After assembly of the electrode materials in the cell, the electrolyte solution in which the salt is dissolved is added. The cell container is then capped.

The electrolyte solution includes a lithium salt dissolved in the electrolyte solvent. Suitable electrolyte solvents include non-aqueous liquid polar solvents such as ethylene carbonate, dimethyl carbonate, ethylmethyl carbonate, diethyl carbonate, and mixtures thereof Other solvents are organic carbonates, lactones, formates, esters, sulfones, nitrites, and oxazolidinones.

There are several types of polymer electrolytes that may be useful in electrochemical cells of the present invention. One type consists of lithium salts dissolved in linear polyethers such as polyethylene oxide which may have branched or comb shaped polymers which have flexible inorganic backbones such as $(-P=N-)_n$ or $(-SiO-)_n$. Polymer electrolytes may be further modified by addition of additives such as plasticizicers such as organic carbonates.

Gelled electrolytes are another type of electrolyte that is useful for the electrochemical cells of this invention. Gelled electrolytes include a solution of a lithium salt in a liquid organic solvent and a supporting matrix of a polymer such as poly(acrylonitrile) (PAN) or poly(vinylidene fluoride-hexafluoro-propylene) (PVDF-HFP) copolymer. Solvent mixtures such as binary or ternary mixtures of organic carbonates can also be used as liquid solvents in gelled electrolytes.

Experimental

All preparations and physical measurements were carried out with rigorous exclusion of air and water. Schienk and glovebox techniques were employed with purified argon used as an inert gas when required. All reagents and solvents were reagent grade or better. Imidazole, benzimidazole, 2-methylimidazole, 4-methylimidazole, 2-isopropylimidazole, and lithium dimethylamide were all purchased from Aldrich and used as received. Boron trifluoride diethyl etherate were both purchased from Alfa Aesar and used as received. The following solvents were dried by distillation from the indicated drying agent: dichloromethane ($P_2O_5$), toluene (Na), and acetone (4 Å molecular sieves). Ethylmethyl carbonate (<30 ppm $H_2O$), ethylene carbonate (<30 ppm $H_2O$), diethyl carbonate (<15 ppm $H_2O$, and dimethyl carbonate (<15 ppm $H_2O$) were purchased from EM Science and used as received.

NMR spectra were recorded using a BRUKER AC 250 or a JEOL GSX 400 MHz NMR spectrometer. Chemical shifts ($\delta$) are relative to $Si(CH_3)_4$ ($\delta$=0 for $^1H$ NMR) and $CFCl_3$ ($\delta$=0 for $^{19}F$ NMR). Negative- and positive-ion electrospray mass spectra were performed on a Micromass Quattro II with cone voltages ranging from 15 to 70 V. Ten $\mu L$ were injected into a Rheodyne injector with a acetonitrile flow.

Conductivities of one molar (1 M) salt solutions (except for lithium bis(trifluoroborane)benzimidazolide which was 0.5 M) at varying temperatures in ethylene carbonate (EC)/ethylmethylmethyl carbonate (EMC) mixture were measured using a Metrohm 712 conductivity meter. The cell assembly was an Orion 018010 or a Metrohm 712 conductivity cell, both of which have platinized platinum electrodes with cell constants of about 1 $cm^{-1}$. Cells were filled and sealed inside a glovebox under an argon atmosphere. The measurement temperatures were controlled to within 1° C. using a Tenney Environmental temperature chamber. The EC/EMC (1:3 by weight) solvent mixture is representative of the solvents used in commercial Li-ion batteries.

Test cells were made which employed a 1 M electrolyte solution of $LiIm(BF_3)_2$ in a 1:1:1 EC:DMC:DEC solvent mixture (by weight). Cathodes comprised a mixture of a transition metal oxide powder, a carbonaceous conductive dilutant, and polyvinylidene fluoride (PVDF) binder that was coated uniformly onto aluminum foil. The transition metal oxide used was $LiNi_{0.8}Co_{0.2}O_2$. The anode was comprised of lithium metal or a carbonaceous powder, a carbonaceous conductive dilutant, and PVDF binder that was coated onto copper foil. Setela® microporous polyethylene film was used as a separator to prevent electrical contact between the anode and cathode electrodes. Other separator materials that may be used include porous glass membranes, for example. Cells made with lithium metal for the anode were made in a button cell configuration with a few drops of the electrolyte and the separator sandwiched between the lithium and the cathode material. A Li-ion cell was constructed using MCMB carbon for the active anode material and $LiNi_{0.8}Co_{0.2}O_2$ as the transition metal oxide for the cathode. The electrolyte was added to the cell inside the glovebox. The theoretical capacity was 7.65 ampere-hour (Ah). The cell was hermetically sealed inside a stainless steel can after formation cycles were completed.

EXAMPLE 1

Lithium Imidazolide ($LiC_3H_3N_2$)

A slurry of imidazole (5.00 g, 73.5 mmol) in toluene (50 mL) was treated with 28 mL of a 2.65 M n-BuLi (74.2 mmol) solution in hexanes. This solution mixture was then refluxed for three days during which time the slurry became an off-white color. The slurry was then filtered over a medium glass frit and the solid was washed with two 10 mL portions of toluene and then dried under vacuum to yield an off white powder. Yield: 5.40 g, 99.4%.

EXAMPLE 2

Lithium bis(trifluoroborane)imidazolide ($Li(BF_3)_2C_3H_3N_2$)

A slurry of lithium imidazolide (5.00 g, 67.6 mmol) in $CH_2Cl_2$ (100 mL) was treated with $BF_3(Et_2O)$ (19.6 mL, 154 mmol) and the mixture was refluxed for five days during which time the slurry became yellow. The solid was then dried under vacuum to yield an off-white solid. Yield: 13.77 g, 97.1%. The solid was then dissolved in 40 mL of ethylmethyl carbonate and filtered. Dichloromethane was added to this filtrate and a precipitate formed. This precipitate was collected and dried under vacuum at 60° C. Yield: 8.63 g, 61%.

$^1H$ NMR (acetone-$d_6$) $\delta$ 7.87 (singlet, 1H), 7.08 (singlet, 2H)

$^{19}F$ NMR (acetone-$d_6$) $\delta$ -147.5 (quartet, $J_{B-F}$=13 Hz)

Low resolution mass spectrum (Negative ion electrospray, acetone solution) Calculated for $C_3H_3N_2B_2F_6$ 203. Found m/z 203 [(M-Li)]$^-$.

EXAMPLE 3

Lithium 2-methylimidazolide ($LiC_4H_5N_2$)

A slurry of 2-methylimidazole (4.00 g, 48.7 mmol) in toluene (50 mL) at 0° C. was treated with 17.4 mL of a 2.8 M n-BuLi (48.7 mmol) solution in hexanes. This solution mixture was then refluxed for one day during which time the slurry became an off-white color. The slurry was then filtered over a medium glass frit and dried to give an off-white solid. Yield: 4.295 g, 100%.

EXAMPLE 4

Lithium bis(trifluoroborane)-2-methylimidazolide (Li($BF_3$)$_2$ $C_4H_5N_2$)

A slurry of lithium 2-methylimidazolide (4.00 g, 67.6 mmol) in $CH_2Cl_2$ (70 mL) at 0° C. was treated with $BF_3(Et_2O)$ (11.7 mL, 93.2 mmol) and the mixture was refluxed for three days during which time the slurry became yellow. The solid was then dried under vacuum to yield an off-white solid. Yield: 9.76 g, 96.0%. The solid was then dissolved in about 15 mL of dimethyl carbonate and filtered. Dichloromethane was added to this filtrate and a precipitate formed. This precipitate was collected and dried under vacuum.

Yield: 7.34 g, 72.2%

$^1H$ NMR (acetone-$d_6$) $\delta$ 6.93 (singlet, 2H), 2.50 (singlet, 3H)

$^{19}F$ NMR (acetone-d-$d_6$) $\delta$ -146.0 (quartet, $J_{B-F}$=14 Hz)

Low resolution mass spectrum (Negative ion electrospray, acetone solution) Calculated for $C_4H_5N_2B_2F_6$ 217. Found m/z 217 [(M-Li)]$^-$.

EXAMPLE 5

Lithium 4-methylimidazolide ($LiC_4H_5N_2$)

A slurry of 4-methylimidazole (4.00 g, 48.7 mmol) in toluene (50 mL) at 0° C. was treated with 17.4 mL of a 2.8 M n-BuLi (48.7 mmol) solution in hexanes. This solution mixture was then refluxed for one day during which time the slurry became an off-white color. The slurry was then filtered over a medium glass flit and dried to give an off-white solid. Yield: 4.365 g, 102%.

EXAMPLE 6

Lithium bis(trifluoroborane)-4-methylimidazolide (Li($BF_3$)$_2$ $C_4H_5N_2$)

A slurry of lithium 2-methylimidazolide (4.00 g, 67.6 mmol) in $CH_2Cl_2$ (70 mL) at 0° C. was treated with $BF_3(Et_2O)$ (11.7 mL, 93.2 mmol) and the mixture was refluxed for three days during which time the slurry became yellow. The solid was then dried under vacuum to yield an off-white solid. Yield: 9.10 g, 89.6%. The solid was then dissolved in about 15 mL of dimethyl carbonate and filtered. Dichloromethane was added to this filtrate and a precipitate formed. This precipitate was collected and dried under vacuum.

Yield: 6.80 g, 66.9%

$^1$H NMR (acetone-d$_6$) δ 7.77 (singlet, 1H), δ6.79 (singlet, 1H), 3.71 (singlet, 3H)

$^{19}$F NMR (acetone-d$_6$) δ −146.6 (quartet, J$_{B-F}$=14 Hz, 3F), δ −148.0 (quartet, J$_{B-F}$=14 Hz, 3F)

Low resolution mass spectrum (Negative ion electrospray, acetone solution) Calculated for C$_4$H$_5$N$_2$B$_2$F$_6$ 217. Found m/z 217 [(M-Li)]$^-$.

EXAMPLE 7
Lithium 2-isopropylimidazolide (LiC$_6$H$_9$N$_2$)

A slurry of 2-isopropylimidazole (4.00 g, 36.3 mmol) in toluene (40 mL) at −78° C. was treated with 17.4 mL of a 2.8 M n-BuLi (48.7 mmol) solution in hexanes. This solution mixture was then refluxed for one day during which time the slurry became orange. The slurry was then filtered over a medium glass frit and dried to give a white solid.

Yield: 4.32 g, 102%.

EXAMPLE 8
Lithium bis(trifluoroborane)-2-isopropylimidazolide (Li(BF$_3$)$_2$C$_6$H$_9$N$_2$)

A slurry of lithium 2-methylimidazolide (4.00 g, 34.4 mmol) in CH$_2$Cl$_2$ (100 mL) at 0° C. was treated with BF$_3$(Et$_2$O) (11.7 mL, 93.2 mmol) and the mixture was refluxed for three days during which time the slurry became yellow. The solid was then dried under vacuum to yield an off-white solid. The solid was then dissolved in about 10 mL of dimethyl carbonate and filtered. Dichloromethane was added to this filtrate and a precipitate formed. This precipitate was collected and dried under vacuum.

Yield: 6.44 g, 58.6%

$^1$H NMR (acetone-d$_6$) δ 6.96 (singlet, 2H), δ3.78 (septet, J$_{H-H}$=7 Hz, 1H), 3.71 (doublet, 7 Hz, 6H)

$^{19}$F NMR (acetone-d$_6$) δ −143.2 (quartet, J$_{B-F}$=14 Hz)

Low resolution mass spectrum (Negative ion electrospray, acetone solution) Calculated for C$_4$H$_5$N$_2$B$_2$F$_6$ 245. Found m/z 245 [(M-Li)]$^-$.

EXAMPLE 9
Lithium benzimidazolide (LiC$_7$H$_5$N$_2$)

A slurry of benzimidazole (8.50 g, 36.3 mmol) in toluene (40 mL) at 0° C. was treated with 25.8 mL of a 2.8 M n-BuLi (72.2 mmol) solution in hexanes. This solution mixture was then refluxed for one day during which time the slurry became off-white. The slurry was then filtered over a medium glass frit and dried to give a white solid.

Yield: 8.629 g, 96.7%.

EXAMPLE 10
Lithium bis(trifluoroborane)benzimidazolide (Li(BF$_3$)$_2$C$_7$H$_5$N$_2$)

A slurry of lithium benzimidazolide (8.25 g, 66.42 mmol) in CH$_2$Cl$_2$ (100 mL) was treated with BF$_3$(Et$_2$O) (17.5 mL, 138.1 mmol) and the mixture was refluxed for three days during which time the slurry became gray. The solid was then dried under vacuum to yield an off-white solid. Yield: 16.14 g, 93.5%. The solid was then dissolved in a 1:3 ethylene carbonate:ethylmethyl carbonate and recrystallized.

Yield: 13.93 g, 48.2% when the two ethylene carbonate molecules are accounted for in the crystal lattice.

$^1$H NMR (acetone-d$_6$) δ 8.35 (singlet, 1H), δ 7.83 (multiplet, 2H), 7.37 (multiplet, 2H)

$^{19}$F NMR (acetone-d$_6$) δ −146.3 (quartet, J$_{B-F}$=14 Hz) spectrum

Low resolution mass spectrum (Negative ion electrospray, acetone solution) Calculated for C$_7$H$_5$N$_2$B$_2$F$_6$ 253. Found m/z 253 [(M-Li)]$^-$. The x-ray structure of LiBenzIm(BF$_3$)$_2$ is shown in FIG. 2.

EXAMPLE 11
Lithium bis(trifluoroborane)dimethylamide (LiN(CH$_3$)$_2$(BF$_3$)$_2$)

A slurry of lithium dimethylamide (1.367 g, 26.80 mmol) in toluene (100 mL) at −78° C. was treated with BF$_3$(Et$_2$O) (17.5 mL, 138.1 mmol) dropwise through an addition funnel. On warming, the solution became bright white. The mixture was then refluxed for three days during which time the slurry became off-white. The slurry was then filtered and the solid was then dried under vacuum to yield an off-white solid.

Yield: 4.26 g, 85.2%.

$^1$H NMR (acetone-d$_6$) δ 2.25 (singlet, 1H)

$^{19}$F NMR (acetone-d$_6$) δ −156.9 (quartet, J$_{B-F}$=17 Hz) spectrum

Low resolution mass spectrum (Negative ion electrospray, acetone solution) Calculated for C$_2$H$_6$NB$_2$F$_6$ 180. Found m/z 180 [(M-Li)]$^-$.

EXAMPLE 12
Conductivity Studies

In this example, the ionic conductivity of electrolyte solutions containing various lithium salts of the present invention. Table 1 below lists the ionic conductivity data for 1 M salt solutions (except for lithium bis(trifluoroborane)benzimidazolide which was 0.5 M) in a 1:3 EC:EMC solvent mixture at various temperatures.

TABLE 1

Ionic Conductivity of 1.0 M$^a$ Lithium Salts in 1:3 EC:EMC

| Salt | Temperature (° C.) | | | | | | | | |
|---|---|---|---|---|---|---|---|---|---|
| | −40 | −25 | −10 | 5 | 20 | 35 | 50 | 65 | 80 |
| | Conductivity (mS/cm) | | | | | | | | |
| Li Im(BF$_3$)$_2$ (Ex. 2) | 0.7 | 1.5 | 2.5 | 3.7 | 5.1 | 6.5 | 7.9 | 9.3 | 10.6 |
| Li 2-MeIm(BF$_3$)$_2$ (Ex. 4) | 0.5 | 1.2 | 2.1 | 3.2 | 4.4 | 5.7 | 7.0 | 8.3 | 9.6 |

TABLE 1-continued

Ionic Conductivity of 1.0 M[a] Lithium Salts in 1:3 EC:EMC

| Salt | Temperature (° C.) | | | | | | | | |
|---|---|---|---|---|---|---|---|---|---|
| | −40 | −25 | −10 | 5 | 20 | 35 | 50 | 65 | 80 |
| | Conductivity (mS/cm) | | | | | | | | |
| Li 4-MeIm(BF$_3$)$_2$ (Ex. 6) | 0.6 | 1.2 | 2.1 | 3.1 | 4.2 | 5.4 | 6.6 | 7.7 | 8.8 |
| Li 2-$^i$PrIm(BF$_3$)$_2$[a] (Ex. 8) | 0.2 | 0.6 | 1.2 | 2.0 | 2.9 | 4.1 | 5.2 | 6.3 | 7.5 |
| Li BenzIm(BF$_3$)$_2$ (Ex. 10) | 0.4 | 1.0 | 1.8 | 2.8 | 3.8 | 4.9 | 6.0 | 7.0 | 7.8 |
| Li N(CH$_3$)$_2$(BF$_3$)$_2$ (Ex. 11) | 0.4 | 0.8 | 1.3 | 1.9 | 2.5 | 3.2 | 3.9 | 4.5 | 5.8 |

[a]The electrolyte solution containing Li BenzIm(BF$_3$)$_2$ (Ex. 10) was only 0.5 M.

EXAMPLE 13

Lithium Batteries with Transition Metal Oxide for Cathode

This example demonstrates that the salts may be used in a lithium battery and compatibility of the salts with a transition metal oxide. A button cell with lithium metal as anode and LiNi$_{0.8}$Cu$_{0.2}$O$_2$ as the active cathode material was prepared inside the glovebox. Between the two electrodes was placed the separator and 60 μL of a 1 M solution of the salt (except LiBenzIm(BF3)$_2$ (Ex. 10) which was 0.5 M) in 1:3 EC:EMC (by weight). The cells were charged and discharged at the C/7 rate from 3.0 to 4.2 V. The capacity of the LiNi$_{0.8}$Co$_{0.2}$O$_2$ in mAh/g for cells prepared with these salts is shown in Table 2 below.

TABLE 2

Capacity of Lithium| LiNi$_{0.8}$Co$_{0.2}$O$_2$ Button Cells Using 1.0 M[a] Lithium Salts in 1:3 EC:EMC for Electrolyte

| Salt | Cycle | | | | | |
|---|---|---|---|---|---|---|
| | 1$^{st}$ Charge | 1$^{st}$ Discharge | 2$^{nd}$ Charge | 2$^{nd}$ Discharge | 5$^{th}$ Charge | 5$^{th}$ Discharge |
| | LiNi$_{0.8}$Co$_{0.2}$O$_2$ Capacity (mAh/g) | | | | | |
| Li Im(BF$_3$)$_2$ (Ex. 2) | 209.5 | 183.3 | 191.6 | 183.2 | 188.1 | 186.0 |
| Li 2-MeIm(BF$_3$)$_2$ (Ex. 4) | 208.8 | 180.8 | 196.3 | 185.8 | 190.4 | 183.0 |
| Li 4-MeIm(BF$_3$)$_2$ (Ex. 6) | 199.7 | 172.3 | 191.3 | 171.5 | 184.6 | 163.4 |
| Li BenzIm(BF$_3$)$_2$[a] (Ex. 10) | 194.5 | 169.5 | 176.7 | 171.8 | 172.2 | 165.8 |
| Li N(CH$_3$)$_2$(BF$_3$)$_2$ (Ex. 11) | 207.3 | 180.6 | 186.5 | 182.3 | 190.7 | 183.9 |

[a]The electrolyte solution containing Li BenzIm(BF$_3$)$_2$ (Ex. 10) was only 0.5 M.

EXAMPLE 14

Lithium Batteries with MCMB Carbon for Cathode

This example demonstrates that the salts may be used in a lithium battery and compatibility of the salts with MCMB carbon, which is a common carbonaceous material used as the active anode material in Li-ion batteries. A button cell with lithium metal as anode and MCMB carbon as the active cathode material was prepared inside the glovebox. Between the two electrodes was placed the separator and 60 μL of a 1 M solution of the salt (except LiBenzIm(BF$_3$)$_2$ (Ex. 10) which was 0.5 M) in 1:3 EC:EMC (by weight). The cells were charged and discharged at the C/7 rate from 0.01 to 3.0 V. The capacity of the MCMB carbon in mAh/g for cells prepared with these salts is shown in Table 2 below.

TABLE 3

Capacity of Lithium|MCMB Carbon Button Cells
Using 1.0 M[a] Lithium Salts in 1:3 EC:EMC for Electrolyte

|  | Cycle | | | | | |
| --- | --- | --- | --- | --- | --- | --- |
| Salt | 1st Discharge | 1st Charge | 2nd Discharge | 2nd Charge | 5th Discharge | 5th Charge |
|  | MCMB Carbon Capacity (mAh/g) | | | | | |
| Li Im(BF$_3$)$_2$ (Ex. 2) | 206.6 | 185.1 | 222.1 | 221.1 | 263.1 | 262.7 |
| Li 2-MeIm(BF$_3$)$_2$ (Ex. 4) | 289.6 | 256.3 | 272.2 | 270.1 | 267.0 | 267.0 |
| Li 4-MeIm(BF$_3$)$_2$ (Ex. 6) | 280.7 | 246.8 | 271.3 | 268.8 | 279.3 | 278.8 |
| Li 2-$^i$PrIm(BF$_3$)$_2$ (Ex. 8) | 123.3 | 97.5 | 185.6 | 182.5 | 250.2 | 249.6 |
| Li BenzIm(BF$_3$)$_2$[a] (Ex. 10) | 54.8 | 35.2 | 62.3 | 58.3 | 128.5 | 127.1 |
| LiN(CH$_3$)$_2$(BF$_3$)$_2$ (Ex. 11) | 172.4 | 141.7 | 217.7 | 206.4 | 155.8 | 153.1 |

[a]The electrolyte solution containing Li BenzIm(BF$_3$)$_2$ (Ex. 10) was only 0.5 M.

EXAMPLE 15
Lithium-Ion Battery

Figure 3:
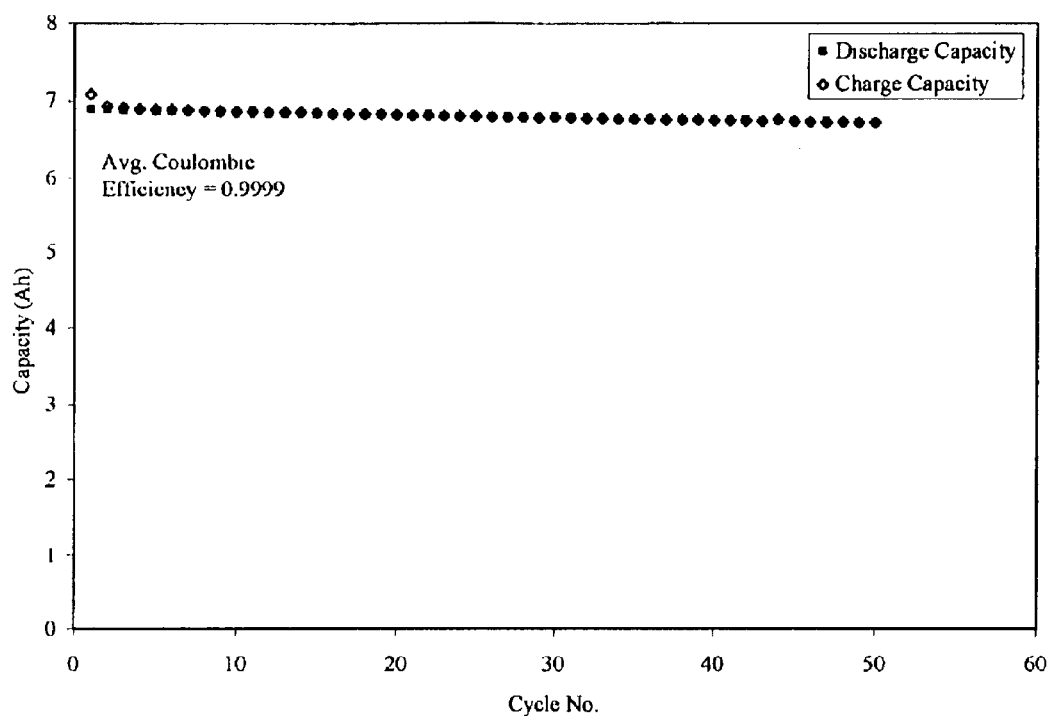
FIG. 3 is a plot of the charge and discharge capacity of a 7 Ah Li-ion battery prepared and tested according to the present invention.

This example demonstrates that the salt may be used in a lithium-ion battery employing a carbonaceous material and transition metal oxide as the active materials in the anode and cathode electrodes, respectively. The active anode material was MCMB carbon and the active cathode material was LiNi$_{0.8}$Co$_{0.2}$O$_2$, which were each coated onto copper and aluminum foil, respectively. A lithium-ion cell with a nominal capacity of 7 Ah was constructed using these electrode materials and separated by a microporous polyethylene sheet. These materials were assembled and placed into a stainless steel can. The electrolyte, a 1 M solution of LiIm(13F$_3$)$_2$ (Ex. 2) in 1:1:1 EC:DMC:DMC, was added to the can and the cell was then put on formation, which consisted of one cycle of a charge and discharge at C/20 rate followed by two cycles at the C/10 rate. During this time gas was allowed to escape through a mineral oil bubbler. After the formation cycles were complete, the cell was hermetically sealed and cycled at the C/5 rate for 50 cycles. The charge and discharge capacity of the cycles after formation is shown in FIG. 3.

Those skilled in the art will appreciate that numerous changes and modifications may be made to the preferred embodiments of the invention and that such changes and modifications may be made with out departing from the spirit of the invention. It is therefore intended that the appended claims cover all such equivalent variations as fall within the true spirit of the invention.

What is claimed is:

1. A non-aqueous electric current producing electrochemical cell comprising an anode and a cathode, an ionically permeable separator and a non-aqueous electrolyte comprising an ionically conducting salt in a non-aqueous medium, the ionically conducting salt corresponding to the formula:

$$M^+(Z^*(J^*)_j(X^*)_x)^-,$$

wherein:

M is a lithium atom,

Z* is an anion group containing two or more Lewis basic sites and comprising less than 50 atoms not including hydrogen atoms, J* independently each occurance is a Lewis acid coordinated to at least one Lewis basic site of Z*, and optionally two or more such J* groups may be joined together in a moiety having multiple Lewis acidic functionality, X* independently each occurrence is selected from the group consisting of H, C$_1$–C$_4$ alkyl, alkoxide, halide and mixtures thereof, j is an integer from 2 to 12, and x is an integer from 0 to 4.

2. A cell according to claim 1 wherein Z* is selected from the group consisting of cyanide, azide, amide, amidinide, substituted amidinide, dicyanamide, imidazolide, substituted imidazolide, imidazolinide, substituted imidazolinide, benzoimidazolide, substituted benzoimidazolide, tricyanomethide, tetracyanoborate, puride, squarate, 1,2,3-triazolide, substituted 1,2,3-triazolide, 1,2,4-triazolide, substituted 1,2,4-triazolide, pyrimidinide, substituted pyrimidinide, tetraimidazoylborate, substituted tetraimidazoylborate, tris(imidazoyl) fluoroborate, substituted tris(imidazoyl) fluoroborate, bis(imidazoyl) difluoroborate, substituted bis(imidazoyl)difluoroborate anions and mixtures thereof, wherein each substituent, if present, is selected from the group consisting of a halo, hydrocarbyl, halohydrocarbyl, silyl, silylhydrocarbyl, a halocarbyl group of up to 20 atoms not counting hydrogen and mixtures thereof, and wherein two substituents, if present, together form a saturated or unsaturated ring system.

3. A cell according to claim 2 wherein Z* is selected from the group consisting of imidazolide, 2-methylimidazolide, 4-methylimidazolide, benzoimidazolide, dimethylamide and mixtures thereof.

4. A cell according to claim 1 wherein J* is a Lewis acid having a formula selected from the group consisting of

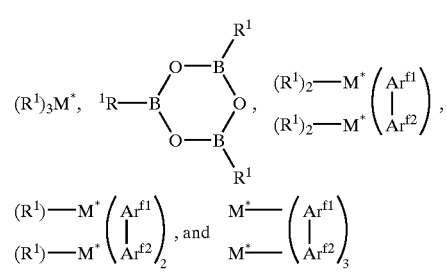

as well as mixtures thereof:

wherein:

M* is aluminum or boron;

R¹ independently each occurrence is selected from the group consisting of a halide, alkyl, aryl, alkoxide, aryloxide, dialkylamido, halogenated alkyl, halogenated aryl, halogenated alkoxide, halogenated aryl oxide and mixtures thereof, R¹ having up to twenty carbon atoms, and $Ar^{f1}-Ar^{f2}$ in combination is independently, a divalent aromatic group of 6 to 20 carbon atoms.

5. A cell according to claim 4, wherein J* corresponds to the formula:

$BR^1_3$ or $AlR^1_3$, wherein:

R¹ is selected from the group consisting of a halogen, a $C_{1-20}$ alkyl, halogenated alkyl, alkoxide, aryloxide, fluorinared alkoxide, fluorinated aryl oxide and mixtures thereof.

6. A cell according to claim 5 wherein R¹ is a halogen.

7. A cell according to claim 5 wherein R¹ is selected from the group consisting of a fluorinated alkyl and fluorinated aryl and mixtures thereof.

8. A cell according to claim 5 wherein R¹ is selected from the group consisting of a fluorinated alkoxide and fluorinated aryl oxide and mixtures thereof.

9. A cell according to claim 8 wherein R¹ is selected from the group consisting of $CF_3CH_2O$, $C_3F_7CH_2O$, $(CF_3)_2CHO$, $(CF_3)_2(CH_3)CO$, $(CF_3)_2(C_6H_5)CO$, $(CF_3)_3CO$, $FC_6H_4O$, $F_2C_6H_3O$, $F_3C_6H_2O$, $F_4C_6HO$, $C_6F_5O$, $(CF_3)\ C_6H_4O$, or $(CF_3)_2C_6H_3O$ and mixtures thereof.

10. A cell according to claim 5 wherein J* is $BF_3$.

11. A cell according to claim 5 wherein R¹ is selected from the group consisting of $CH_2CF_3$, $C_6F_5$, $(CF_3)_2C_6H_3$ and mixtures thereof.

12. A cell according to claim 1 wherein said ionically conductive salt is a lithium salt selected from the group consisting of lithium bis(trifluoroborane) imidazolide, lithium bis(trifluoroborane)-2-methylimidazolide, lithium bis(trifluoroborane)-4-methylimidazolide, lithium bis(trifluoroborane)-2-isopropylimidazolide, lithium bis(trifluoroborane)benzimidazolide, lithium bis(trifluoroborane)dimethylamide, lithium bis(trifluoroborane)diisopropylamide, lithium bis(trimethoxyborane)imidazolide, lithium bis(trimethoxyborane)-2-methylimidazolide, lithium bis(trimethoxyborane)-4-methylimidazolide, lithium bis(trimethoxyborane)-2-isopropylimidazolide, lithium bis(trimethoxyborane)benzimidazolide, lithium bis(trimethoxyborane)dimethylamide, lithium bis(trimethoxyborane)diisopropylamide, lithium tetrakis(trifluoroborane)tetraimidazoylborate, lithium tris(trifluoroborane)triimidazoylfluoroborate, lithium bis(trifluoroborane)diimidazoyldifluoroborate, lithium tetrakis(trifluoroborane)tetrakis(dimethylamino)borate, lithium tris(trifluoroborane)tris(dimethylamino)fluoroborate, lithium bis(trifluoroborane)bis(dimethylamino)difluoroborate and mixtures thereof.

13. A cell according to claim 1, wherein the anode is selected from the group consisting of lithium metal, lithium alloys, lithium metal intercalation compounds of carbon and graphite, lithium metal intercalating metal oxides, lithium metal intercalating metal chalcogenides and mixtures thereof.

14. A cell according to claim 1, wherein the cathode is selected from the group consisting of a transition metal oxide, a transition metal chalcogenide, a poly(carbon disulfide) polymer, an organo-disulfide redox polymer, a polyaniline, an organodisulfide/polyaniline composite and a transition metal oxysulfide and mixtures thereof.

15. A cell according to claim 1, wherein the non-aqueous medium is selected from the group consisting of non-aqueous liquid polar solvents, solid polymers and polymer gels.

16. A according to claim 15, wherein the non-aqueous liquid polar solvent is an organic solvent selected from the group consisting of ethers, esters, carbonates, sulfones, nitriles, formats, lactones and mixtures thereof.

17. A cell according to claim 15, wherein the organic solvent is selected from the group consisting of ethylene carbonate, propylene carbonate and dialkyl carbonates of the general formula $R^1OCOOR^2$ where $R^1$ and $R^2$ are selected independently from a $C_1$–$C_4$ alkyl.

18. A cell according to claim 17, wherein the organic solvent is selected from the group consisting of dimethyl carbonate, diethyl carbonate, ethylmethyl carbonate, ethylene carbonate, propylene carbonate and mixtures thereof.

19. A cell according to claim 17, wherein the organic solvent is an ether selected from the group consisting of diethyl ether, 1,2-dimethoxy ethane, tetrahydrofuran, dioxolane and mixtures thereof.

20. A cell according to claim 15 wherein the lactone is gama-butyrolactone.

21. A cell according to claim 1, wherein the separator is a microporous polyethylene film or a porous glass membrane.

22. A non-aqueous electrolyte for an electric current producing electrochemical cell comprising an ionically conducting salt in a non-aqueous medium, the ionically conducting salt corresponding to the formula:

$M^+(Z^*(J^*)_j(X^*)_x)^-$, wherein:

M is a lithium atom,

Z* is an anion group containing two or more Lewis basic sites and comprising less than 50 atoms not including hydrogen atoms, J* independently each occurance is a Lewis acid coordinated to at least one Lewis basic site of Z*, and optionally two or more such J* groups may be joined together in a moiety having multiple Lewis acidic functionality, X* independently each occurrence is selected from the group consisting of H, $C_1$–$C_4$ alkyl, alkoxide, halide and mixtures thereof, j is an integer from 2 to 12, and x is an integer from 0 to 4.

23. A non-aqueous electrolyte according to claim 22 wherein Z* is selected from the group consisting of cyanide, azide, amide, amidinide, substituted amidinide, dicyanamide, imidazolide, substituted imidazolide, imidazolinide, substituted imidazolinide, benzoimidazolide, substituted benzoimidazolide, tricyanomethide, tetracyanoborate, puride, squarate, 1,2,3-triazolide, substituted 1,2,3-triazolide, 1,2,4-triazolide, substituted 1,2,4-triazolide, pyrimidinide, substituted pyrimidinide, tetraimidazoylborate, substituted tetraimidazoylborate, tris(imidazoyl)fluoroborate, substituted tris(imidazoyl)fluoroborate, bis(imidazoyl)difluoroborate, substituted bis(imidazoyl)difluoroborate anions, and mixtures thereof, wherein each substituent, if present, is selected from the group consisting of a halo, hydrocarbyl, halohydrocarbyl, silyl, silylhydrocarbyl and a halocarbyl group of up to 20 atoms not counting hydrogen, and wherein two substituents, if present, together form a saturated or unsaturated ring system.

24. A non-aqueous electrolyte according to claim 23 wherein $Z^*$ is selected from the group consisting of imidazolide, 2-methylimidazolide, 4-methylimidazolide, benzoimidazolide, dimethylamide and mixtures thereof.

25. A non-aqueous electrolyte according to claim 23 wherein said ionically conductive salt is a lithium salt selected from the group consisting of lithium bis(trifluoroborane)imidazolide, lithium bis(trifluoroborane)-2-methylimidazolide, lithium bis(trifluoroborane)-4-methylimidazolide, lithium bis(trifluoroborane)-2-isopropylimidazolide, lithium bis(trifluoroborane)benzimidazolide, lithium bis(trifluoroborane)dimethylamide, lithium bis(trifluoroborane)diisopropylamide, lithium bis(trimethoxyborane)imidazolide, lithium bis(trimethoxyborane)-2-methylimidazolide, lithium bis(trimethoxyborane)-4-methylimidazolide, lithium bis(trimethoxyborane)-2-isopropylimidazolide, lithium bis(trimethoxyborane)benzimidazolide, lithium bis(trimethoxyborane)dimethylamide, lithium bis(trimethoxyborane)diisopropylamide, lithium tetrakis(trifluoroborane)tetraimidazoylborate, lithium tris(trifluoroborane)triimidazoylfluoroborate, lithium bis(trifluoroborane)diimidazoyldifluoroborate, lithiumtetrakis(trifluoroborane)tetrakis(dimethylamino)borate, lithium tris(trifluoroborane)tris(dimethylamino)fluoroborate, lithium bis(trifluoroborane)bis(dimethylamino)difluoroborate and mixtures thereof.

26. A non-aqueous electrolyte according to claim 23, wherein said non-aqueous medium is selected from the group consisting of non-aqueous liquid polar solvents, solid polymers and polymer gels.

27. A non-aqueous electrolyte according to claim 26 wherein said non-aqueous liquid polar solvent is an organic solvent selected from the group consisting of ethers, esters, carbonates, sulfones, nitriles, formats, lactones and mixtures thereof.

28. A non-aqueous electrolyte according to claim 27, wherein said organic solvent is selected from the group consisting of ethylene carbonate, propylene carbonate and dialkyl carbonates of the general formula $R^1OCOOR^2$ where $R^1$ and $R^2$ are selected independently from a $C_1-C_4$ alkyl.

29. A non-aqueous electrolyte according to claim 28, wherein said dialkyl carbonate is selected from the group consisting of dimethyl carbonate, diethyl carbonate, ethylmethyl carbonate, ethylene carbonate, propylene carbonate and mixtures thereof.

30. A non-aqueous electrolyte according to claim 28, wherein said organic solvent is an ether selected from the group consisting of diethyl ether, 1,2-dimethoxyethane, tetrahydrofuran, dioxolane and mixtures thereof.

31. A non-aqueous electrolyte according to claim 28, wherein said lactone is gama-butyrolactone.

32. A non-aqueous electrolyte according to claim 22 wherein $J^*$ is a Lewis acid selected from the group consisting of

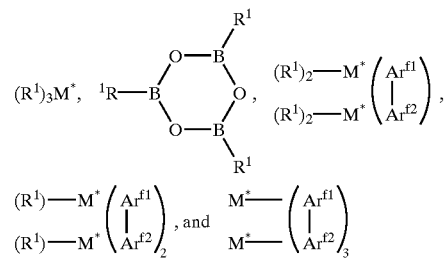

and mixtures thereof:
wherein:
  $M^*$ is aluminum or boron;
  $R^1$ independently each occurrence is selected from the group consisting of a halide, alkyl, aryl, alkoxide, aryloxide, dialkylamido, halogenated alkyl, halogenated aryl, halogenated alkoxide, halogenated aryl oxide and mixtures thereof, $R^1$ having up to twenty carbon atoms, and $Ar^{f1}-Ar^{f2}$ in combination is independently, a divalent aromatic group of 6 to 20 carbon atoms.

33. A non-aqueous electrolyte according to claim 32, wherein $J^*$ corresponds to the formula:

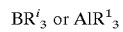

wherein:
  $R^1$ is selected from the group consisting of a halogen, a $C_{1-20}$ alkyl, halogenated alkyl, alkoxide, aryloxide, fluorinared alkoxide, fluorinated aryl oxide and mixtures thereof.

34. A non-aqueous electrolyte according to claim 33 wherein $R^1$ is a halogen.

35. A non-aqueous electrolyte according to claim 33 wherein $R^1$ is selected from the group consisting of a fluorinated alkyl and fluorinated aryl and mixtures thereof.

36. A non-aqueous electrolyte according to claim 33 wherein $R^1$ is selected from the group consisting of a fluorinated alkoxide and fluorinated aryl oxide and mixtures thereof.

37. A non-aqueous electrolyte according to claim 33 wherein $R^1$ is selected from the group consisting of $CF_3CH_2O$, $C_3F_7CH_2O$, $(CF_3)_2CHO$, $(CF_3)_2(CH_3)CO$, $(CF_3)_2(C_6H_5)CO$, $(CF_3)_2CO$, $FC_6H_4O$, $F_2C_6H_3O$, $F_3C_6H_2O$, $F_4C_6HO$, $C_6F_5O$, $(CF_3)C_6H_4O$, $(CF_3)_2C_6H_3O$ and mixtures thereof.

38. A non-aqueous electrolyte according to claim 33 wherein $J^*$ is $BF_3$.

39. A non-aqueous electrolyte according to claim 33 wherein $R^1$ is selected from the group consisting of $CH_2CF_3$, $C_6F_5$, $(CF_3)_2C_6H_3$ and mixtures thereof.

40. A compound useful as an ionically conducting salt in a non-aqueous electrolyte for a lithium electrochemical cell corresponding to the formula:

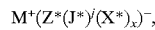

wherein:
  M is lithium,
  Z* is an anion group containing two or more Lewis basic sites and comprising less than 50 atoms not including hydrogen atoms,
  J* independently each occurrence is a Lewis acid coordinated to at least one Lewis basic site of Z*, and optionally two or more such J* groups may be joined together in a moiety having multiple Lewis acidic functionality,
  X* is selected from the group consisting of H, $C_1$–$C_4$ alkyl, alkoxide and a halide and mixtures thereof,
  j is an integer from 2 to 12, and
  x is an integer from 0 to 4.

* * * * *